United States Patent [19]

Schuster et al.

[11] Patent Number: 4,482,696
[45] Date of Patent: Nov. 13, 1984

[54] AVOIDING AN EXPLOSIVE GAS PHASE IN GAS/LIQUID REACTIONS

[75] Inventors: Hans H. Schuster, Ludwigshafen; Hermann Dreher, Seeheim-Jugendheim; Juergen Hambrecht, Heidelberg, all of Fed. Rep. of Germany

[73] Assignee: BASF Aktiengesellschaft, Ludwigshafen, Fed. Rep. of Germany

[21] Appl. No.: 465,760

[22] Filed: Feb. 11, 1983

[51] Int. Cl.³ .............................................. C08G 65/44
[52] U.S. Cl. ................................. 528/212; 260/687 R; 422/117; 422/227; 528/176; 528/214; 528/215; 528/217; 585/951
[58] Field of Search ................. 528/212, 176, 214–215, 528/217; 260/687 R; 585/951; 422/117, 227

[56] References Cited

U.S. PATENT DOCUMENTS 4,396,758  8/1983  Nikiforov et al. .................. 528/176

FOREIGN PATENT DOCUMENTS 1557018  3/1970  Fed. Rep. of Germany ...... 528/212

OTHER PUBLICATIONS

Chem.-Ing.-Tech. 52, (1980), Nr. 12, S. 951–965.

Primary Examiner—Lester L. Lee
Attorney, Agent, or Firm—Keil & Weinkauf

[57] ABSTRACT

A coherent explosive gas phase in a gas/liquid reactor comprising a tubular body which is closed at the top and into which one or more jets of liquid which are fed from a liquid circulation and are directed downward, emerge from one or more nozzles located at the highest point of the reactor, and entrain a gas phase which is to be dispersed, introduce it into the liquid and finally produce complete dispersion of the gas, is avoided by a method wherein, before start-up of the liquid circulation, the inactive reactor is charged with an amount of liquid reactant such that a gas space corresponding to the subsequent gas hold-up of dispersed bubbles under operating conditions remains at the top of the reactor, this gas space is filled with a gas, at a pressure $p_1$, which is inert under the reaction conditions, and the gaseous reactant is fed to the reactor only when, under the action of the liquid jet or jets, the inert gas has been dispersed into a hold-up of dispersed bubbles so that a coherent gas phase no longer exists.

6 Claims, 1 Drawing Figure

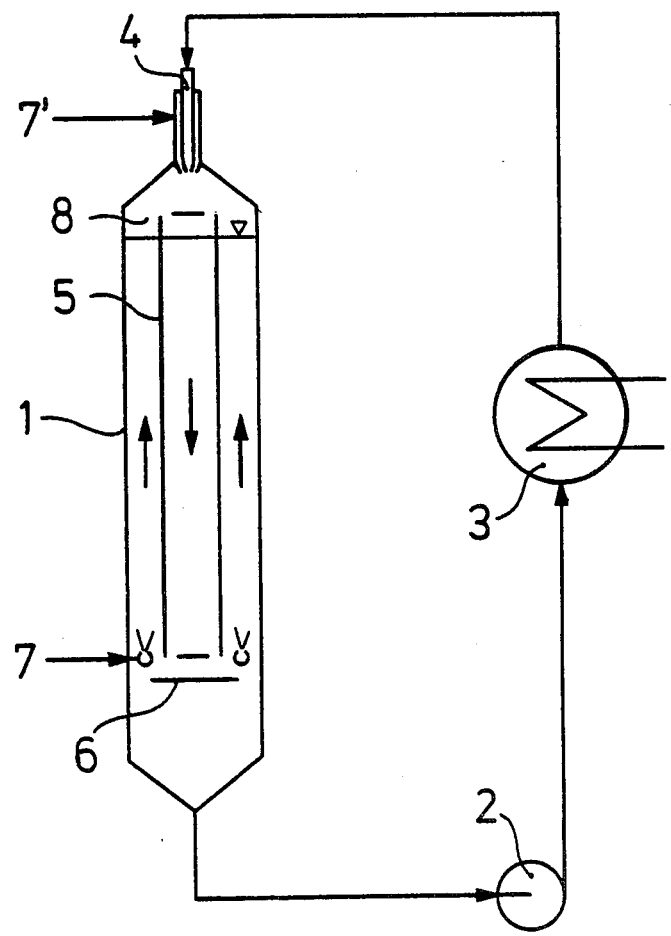

AVOIDING AN EXPLOSIVE GAS PHASE IN GAS/LIQUID REACTIONS

The present invention relates to a method as described into a hold-up of dispersed bubbles.

Reactions between a liquid and a gas, which are carried out frequently in the chemical industry, take place as a rule in the liquid phase. The gas/liquid mass transfer which is a precondition in these reactions requires adequate dispersing of the gaseous medium in the liquid in order to provide the necessary transfer surfaces between the phases. A review of the apparatus designs conventionally used for this purpose is given in, for example, CIT 52 (1980), 951–965.

For gas/liquid reactions involving relatively large reactor volumes and relatively high pressures and temperatures, the stirred kettle predominantly employed in the chemical industry is preferably avoided as a reactor type. In the case of submersed reactors which are usually used instead, the energy required to disperse the gas is supplied either by gas compression or by liquid circulation with a circulatory pump in the external cycle.

However, a common feature of all the above types of reactor is that, where the gas has a low solubility and/or the rate of reaction of the gaseous with the liquid reactant is slow, a coherent gas phase forms above the phase boundary in the reactor.

Particularly in certain oxidation reactions in which combustible organic media are brought into contact with, for example, oxygen or oxygen-containing gas mixtures, the presence or formation of such coherent gas spaces is substantially disadvantageous, if not impermissible for safety reasons. The gas mixture contains, in addition to a substantial amount of oxygen, in most cases vapors of the organic medium, with the resultant danger of explosion or detonation.

In conventional processes, for example as described in German Laid-Open Application DOS No. 1,557,018, an oxygen breakthrough can be shifted in the direction of higher gas load, ie. greater amounts of gas fed in per unit area of reactor cross section, but these methods do not guarantee to avoid it.

Provided a suitable reactor is used, a conventional secondary preventive measure for avoiding explosive states is to mix the explosive gas mixtures, which collect in the coherent gas space, with a stream of inert gas in a ratio such that the resulting mixture is safely outside the explosion range.

The disadvantage of this procedure is that, because of the very wide explosion range, in particular in the case of oxygen, large amounts of the inert gas have to be fed in, and, depending on the vapor pressure and degree of saturation, some organic reaction medium is inevitably discharged together with the waste gas containing inert gas. Even if discharge into the atmosphere is permissible at all as a means of disposal, this procedure leads to loss of useful materials, such as the inert gas and the gaseous and liquid reactants, in addition to polluting the environment.

Moreover, if the liquid reaction medium contains dissolved or suspended solids, and if it is necessary to prevent solids from being deposited (encrustations, etc.) by flotation or loss of solvent as a result of evaporation in the region of the gas/liquid phase boundary, the inert gas stream entering the reaction space must beforehand be brought into saturation equilibrium with the solvent used in the reaction. The above waste gas losses are maximized as a result of this procedure. If, on the other hand, such a discharge of waste gas is not permissible and the constituents thereof have to be retained, the separating and working up equipment required for this is as a rule particularly expensive because of the comparatively large amount of inert gas.

It is an object of the present invention to provide a procedure which is suitable for carrying out gas/liquid reactions, is substantially free of waste gas, avoids the formation of a coherent gas phase during operation of the reactor and therefore can also be employed where the type and proportions of the reactants would indicate the formation of an explosive gas phase.

We have found that this object is achieved by following the features of the invention, in particular by the use of the conventional plunging jet principle, in which an intense jet of liquid directed downward passes through the gas phase and strikes a liquid surface, breaks through this surface and penetrates the liquid volume. To a small depth of immersion, the liquid jet is enveloped by a jacket of entrained gas. As the depth of immersion increases, the gas envelope breaks up and leads to intensive formation of very fine primary bubbles (<0.5 mm in diameter) which spread out conically in the direction of the jet. As a result of this change of momentum between the high-velocity two-phase jet and the surrounding liquid, the latter is increasingly entrained into the two-phase region, in accordance with the laws governing the propagation of free jets. The decrease in the jet velocity and the coalescing of primary bubbles lead to the formation of relatively large secondary bubbles (about 2–3 mm in diameter in the water/air system) which follow the downward motion of the jet only until their buoyancy exceeds the frictional forces of the downward velocity field. The secondary bubbles which then escape laterally from the region of the jet also accelerate, in accordance with the gas-lift principle, the upward movement of liquid in regions remote from the jet, and effect increased liquid circulation.

If the plunging jet principle is employed in a vessel which is closed at the top and charged with gas and liquid and into which the jet of liquid enters at the highest point, and if the gas volumes and jet conditions are chosen so that the rate at which gas is introduced by the jet exceeds the rate of separation of the secondary bubbles of gas leaving the liquid, the liquid interface which is initially present in the vessel vanishes after a short time. Secondary bubbles of gas which rise in the liquid are once again captured by the jet and are carried downward into the system while being broken down. In the equilibrium state, the total gas phase is present in dispersed form as a gas hold-up, ie. the initially coherent gas phase no longer exists and is dispersed as bubbles.

However, in the case of reactant combinations which can form explosive gas mixtures, the existence of coherent gas spaces in danger of explosion should be avoided, for safety reasons, whenever the reactor is operating, ie. these cannot be tolerated up to the time when the above hydrodynamic equilibrium state or complete gas dispersion has been reached, or after this state ceases to exist.

Thus, according to the invention, a plunging jet apparatus of the conventional type described above (U.S. Pat. No. 2,128,311), having a concentric guide tube (German Laid-Open Application DOS No. 2,645,780) and a jet inlet located at the highest point of the closed reaction vessel, is flushed with a gas which is inert to the reactants. Thereafter, the reactor is charged with liquid reaction medium to a volume corresponding to the envisaged gas hold-up which should be chosen in accordance with the rules of the art (cf. Ger. Chem. Eng. 2 (1979), 224 et seq.), and the gas space above the liquid, which space is filled with inert gas, is brought to a presure $p_1$, if necessary by forcing in more inert gas. When the liquid circulation is subsequently started up, the jet from the nozzle disperses the inert gas. The gaseous reactant is introduced only when the inert gas has been completely dispersed, ie. the plunging jet reactor is in hydrodynamic equilibrium. The point at which this reactant is introduced is not critical, but is advantageously located either in the lower part of the outer annular space or in the region of the nozzle.

For operation of the reactor, it is advantageous to restrict the pressure of the gaseous reactant to a predetermined level $p_2$ ($p_2 > p_1$), and during the reaction time $p_2$ can be either constant or a function of a suitable control parameter, eg. reaction time, conversion, rate of change of enthalpy of conversion or reaction, etc.

The operating reactor can be shut down, without the formation of a coherent explosive gas phase, by bringing the pressure in the reactor, if necessary with a further amount of inert gas fed in at a suitable point, for example at the top of the reactor, to a level $p_3$ which ensures that the gas composition present in the reactor and known at any time from the particular parameters $p_1$ and $p_2$ is shifted to safely outside the explosion limits. Where the gaseous reactant is pure oxygen, this condition is fulfilled with the majority of hydrocarbons when $p_3 > 10(p_2 - p_1)$. Any coherent gas phase which forms after the liquid jet has been interrupted following adjustment to $p_3$ with inert gas is acceptable because it is non-explosive; after the pressure of the gas phase has been let down, shut-down of the reactor is complete.

In the novel mode of reactor operation, rendering the gas mixture inert by means of pressure is a reliable safety measure even where a serious breakdown occurs, and has the advantage that, after the breakdown (eg. jet failure) has been eliminated, the reactor can be started again without loss of useful materials. The only precondition for this is that the gas content which has been rendered inert is let down beforehand to a pressure of $\approx p_1$.

System monitoring, and where necessary activation of the safety equipment, can be effected on the basis of more or less redundant combinations of indirect parameters (liquid flow, pressure difference at the jet nozzle, electrical or mechanical failure of the liquid circulation pump) and direct parameters (density changes, gas concentration at the top of the reactor, etc.). The necessary expense of monitoring is smaller, rather than otherwise, than that required in the waste gas procedure, since in the novel process it is possible to assume substantially homogeneous reactor contents, a condition which, as is known, is not ensured in the waste gas procedure.

In particular, the following advantages are achieved with the invention:

The hydrodynamic start-up of the reactor is effected using an inert gas instead of a gaseous reactant which is unacceptable for safety reasons (eg. oxygen). Any catalyst employed in the reaction can be added at the outset to the system, and is present in the reactor in homogeneous distribution at the beginning of the reaction (eg. $O_2$ feed-in).

Temporarily high reaction rates cannot, as in the case where only gaseous reactants controlled by the rate of flow are present, lead under certain circumstances to complete consumption of these reactants, and hence to the breakdown of the internal reactor cycle: in the novel procedure, the reactant gas can be fed to the system at the rate and time which are chemically or technically most advantageous for the reaction. Even complete interruption of the reactant gas supply at a high rate of conversion is acceptable; in this case, the reactor pressure decreases in a controlled manner to the initial pressure $p_1$ of the inert gas hold-up, while the gas dispersion is maintained. In the operating state, the pressure in the reactor varies from $p_1$ (minimum of reactant gas) to the permissible pressure $p_2$ (maximum of reactant gas), ie. the reactant gas may be fed in intermittently (for example, for reasons of restricted heat transfer capacity) or continuously at the rate at which it is consumed.

By means of the pressure ratio $p_1/p_2$ which can be chosen freely within wide limits, the inert gas/reactant gas composition can be established, and adapted to the desired reaction conditions.

The inert gas buffering in the reactor replaces a hydraulic accumulator in a simple manner without involving the danger of uncontrolled segregation (gas/liquid or liquid/solid), and an additional degree of freedom, which is also important from the point of view of safety, is obtained for the operation of the reactor.

The inert gas buffering in the reactor makes it possible to operate the latter in a manner which does not cause pollution and produces little waste gas, even in the case of those gas/liquid reactions which otherwise, owing to the formation of explosive gas mixtures, would require a waste gas procedure under inert conditions which, without the use of expensive recovery equipment, furthermore leads to losses of useful materials.

The Example which follows, of oxidative coupling of an alkylphenol with pure oxygen to give polyphenylene oxide (PPO), illustrates the invention. It is of course possible to carry out other gas/liquid reactions with gaseous oxidizing agents, which otherwise tend to form explosive gas mixtures.

Parts are by weight, unless stated otherwise.

EXAMPLE

The reaction apparatus used is shown diagrammatically in FIG. 1, has the principal dimensions listed in the Table below, and comprises a cylindrical part 1 which is closed at the top and bottom by domed surfaces, and from the lowest point of which, via an external cycle provided with a liquid circulation pump 2 and a heat exchanger 3, liquid is withdrawn, this liquid being returned at the topmost point of the reactor, via a nozzle 4, in a downward jet which strikes the liquid reactor content, in a guide tube 5 located concentrically to the liquid jet, and is deflected by a baffle 6. The reaction mixture, which was introduced into the nitrogen gas-filled reactor with the liquid circulation not in operation and the gas displacement line open, was prepared in the following manner: 1.82 parts of cu(I) bromide, 21.8 parts of di-n-butylamine and 2 parts of 2,6-dimethylphenol (DMP) were initially taken, and a solution of 204 parts of DMP in 1645 parts of toluene were added, at 20° C. under nitrogen, to the stirred mixture.

The reactor was charged with an amount of this mixture such that an $N_2$-filled gas space 8 corresponding to 10% of the total reactor volume remained. When the charged reactor was closed, the pressure $p_1$ at the top was 1 bar (absolute). After start-up of the liquid circulation pump 2, its speed was adjusted so that the pressure difference at nozzle 4 was about 2.5 bar (absolute). As soon as the liquid jet had completely dispersed the nitrogen gas present at the top of the reactor, ie. a coherent gas phase no longer existed, which was the case after a few seconds, oxygen gas was introduced, either into the outer annular space 7 at the lower end of guide tube 5, or at the top of the reactor in the region of nozzle 7', in such a manner that the temperature inside the reactor did not exceed 30° C., and the maximum internal pressure $p_2$ at the top of the reactor was 2 bar (absolute).

After 90 minutes, the supply of oxygen was interrupted and the pressure in the reactor was increased to 10 bar (absolute) with nitrogen. The liquid circulation was interrupted, and thereafter the reactor pressure was let down via a gas displacement line, and a non-solvent, eg. methanol, was added to the polymeric reaction solution in an amount corresponding to about 3 times that of the reaction solution. The precipitated polyphenylene oxide, after it had been isolated and dried, had an intrinsic viscosity of 0.55 dl/g, measured in chloroform at 30° C.

TABLE

| Geometrical dimensions of the reaction apparatus | |
|---|---|
| Total volume, liters | 11.2 |
| Diameter D of the cylindrical portion, mm | 108 |
| Length of the cylindrical portion | 8.3 D |
| Diameter of the inner guide tube | 0.40 D |
| Length of the inner guide tube | 6.5 D |
| Nozzle diameter | 0.04 D |
| Distance from the nozzle orifice to the upper edge of the guide tube | 0.45 D |

We claim:

1. A method of avoiding a coherent explosive gas phase in a gas/liquid reactor having a tubular body which is closed at the top and into which one or more jets of liquid, which are fed from a liquid circulation and are directed downward, emerge from one or more nozzles located at the highest point of the reactor, and entrain a gas phase which is to be dispersed, introduce it into the liquid and finally produce complete dispersion of the gas, wherein, the said method comprises: before start-up of the liquid circulation, the inactive reactor is first charged with an amount of liquid reactant to a level leaving a gas space corresponding to the subsequent gas hold-up of dispersed bubbles under operating conditions at the top of the reactor, then said gas space is filled with a gas, at a pressure $p_1$, which is inert under the reaction conditions, and the gaseous reactant is fed to the reactor only when, under the action of the liquid jet or jets, the inert gas and the liquid reactant have reached a hydrodynamic equilibrium wherein the total inert gas phase has been dispersed into a hold-up of dispersed bubbles so that a coherent gas phase no longer exists.

2. A method as claimed in claim 1, wherein the reactant gas is fed in at a pressure which is restricted to $p_2 > p_1$.

3. A method as claimed in claim 1, wherein the reactant gas is introduced continuously.

4. A method as claimed in claim 1, wherein the reactant gas is introduced intermittently.

5. A method as claimed in claim 1, wherein the introduction of the reactant gas is governed by a suitable control parameter.

6. A method as claimed in claim 1, wherein, before the liquid jet which disperses the gas is shut down, the partial pressure of the inert gas in the reactor is increased to not less than that required to prevent the reactant gas from forming an explosive gas mixture, ie. its partial pressure is outside the explosion limits.

* * * * *

UNITED STATES PATENT AND TRADEMARK OFFICE
CERTIFICATE OF CORRECTION

PATENT NO. : 4,482,696

DATED : Nov. 13, 1984

INVENTOR(S) : Schuster et al.

It is certified that error appears in the above-identified patent and that said Letters Patent are hereby corrected as shown below:

On page 1, after [22] insert

[30] Foreign Application Priority Data
    Feb. 25, 1982 [DE] Fed. Rep. of Germany ... 3206661

Signed and Sealed this

Second Day of April 1985

[SEAL]

Attest:

DONALD J. QUIGG

Attesting Officer     Acting Commissioner of Patents and Trademarks